United States Patent [19]

Ward et al.

[11] 4,413,436
[45] Nov. 8, 1983

[54] AQUARIUM WITH SIMULATED STREAM FLOW

[76] Inventors: Michael L. Ward, c/o George Spector 3615 Woolworth Bldg. 233 Broadway; George Spector, c/o Michael L. Ward 3615 Woolworth Bldg. 233 Broadway, both of New York, N.Y. 10007

[21] Appl. No.: 384,093

[22] Filed: Jun. 1, 1982

[51] Int. Cl.³ .............................................. G09F 1/12
[52] U.S. Cl. ........................................ 40/160; 119/5; 40/326
[58] Field of Search ...................... 119/5; 40/160, 326; 428/13

[56] References Cited

U.S. PATENT DOCUMENTS

| | | | |
|---|---|---|---|
| 405,678 | 6/1889 | Rand | 40/160 |
| 1,288,198 | 6/1916 | Oshima | 40/326 |
| 2,133,740 | 10/1938 | Donohue | 119/5 |
| 2,751,880 | 6/1956 | Markowski | 119/5 |
| 2,814,895 | 12/1957 | Flam | 40/160 |

FOREIGN PATENT DOCUMENTS 535526 4/1941 United Kingdom ................... 119/5

*Primary Examiner*—Gene Mancene
*Assistant Examiner*—Wenceslao J. Contreras

[57] ABSTRACT

A miniature sized, scenic display which includes a transparent case containing a three dimensional landscape of a village of houses located in a woods alongside a lake, boats and flower blossoms floating on the water surface, a school of imitation fish swimming underwater, and the water circulating variably in the lake by means of a paddle mechanism, so to give movement to the floating and swimming objects.

3 Claims, 7 Drawing Figures

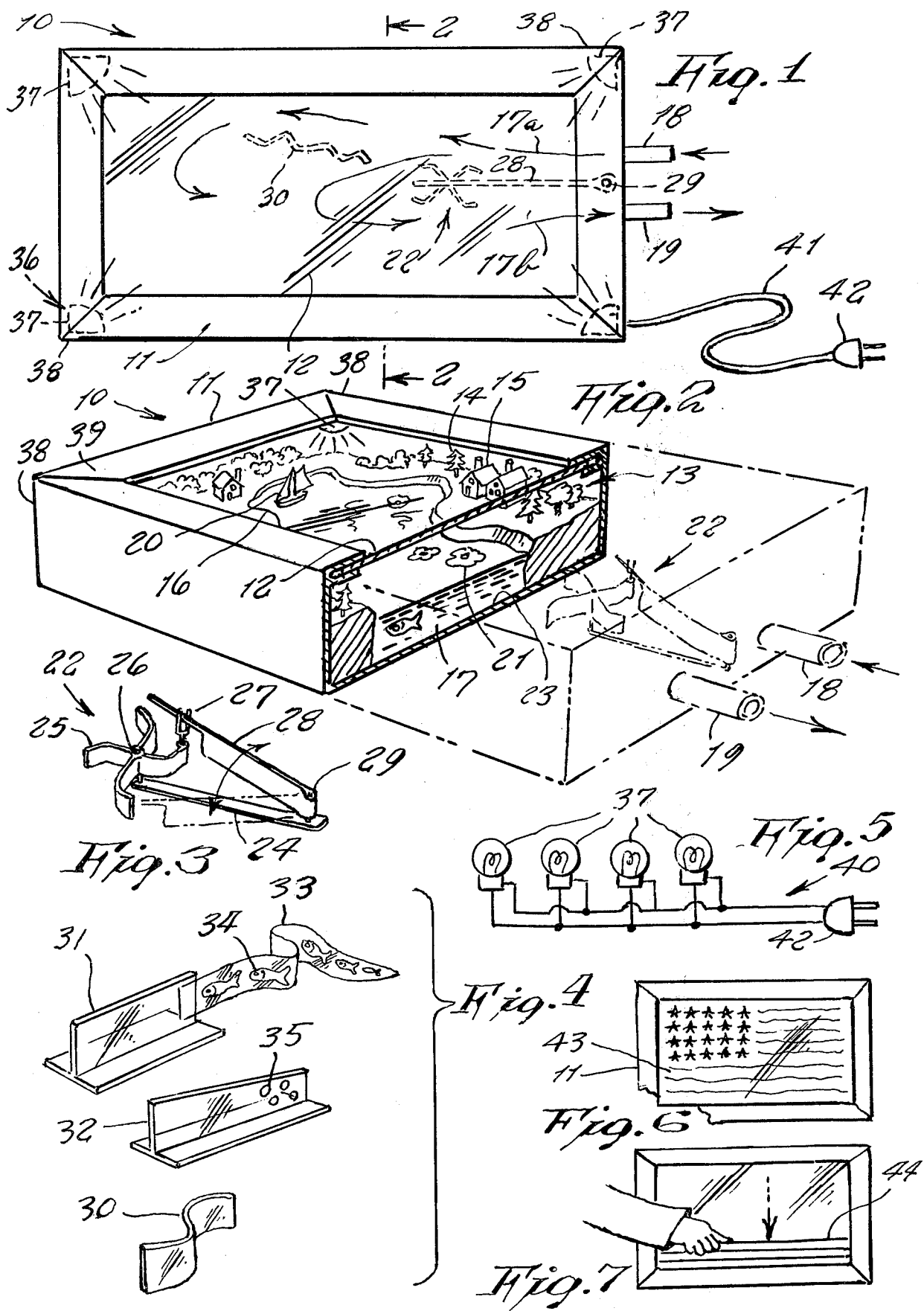

AQUARIUM WITH SIMULATED STREAM FLOW

This invention relates generally to miniature displays. More specifically it relates to animated displays.

A principal object for the present invention is to provide an interesting miniature display that stirs the imagination of an observer by its realism.

Another object is to provide a display which is animated by a variable movement of objects floating on a water surface within the display, so that the display gives the same restful effect to an observer contemplating the flames in a fireplace while meditating.

Other objects are to provide a Lily Pad which may be made in any pleasing design such as a miniature landscape, seascape, or any design such as a flag or a display of multicolored lights or musical sounds additionally thereto.

Still other objects are to provide a Lily Pad display which is simple in design, inexpensive to manufacture, and which is fascinating to all persons, young or old.

FIG. 1 is a top view of the invention, and showing a stationary and an automatically movable, water current control baffles built in a bottom of the case.

FIG. 2 is a cross sectional perspective view on line 2—2 of FIG. 1, and showing floating objects in the flowing water.

FIG. 3 is a perspective view of the movable baffle shown in FIGS. 1 and 2, and which is operated automatically by the water current.

FIG. 4 is a view of extra baffles selectively placeable in the water so to alter water flow currents as wished, the baffles being of transparent plastic so to be invisible when underwater, a first of the baffles including a tail of transparent plastic polyethylene with fish painted on it in opaque paint, so that as the tail waves in the current, it gives the appearance of a school of fish swimming underwater, the second of which is lower in height toward one end so to allow an upper part of the water to flow thereacross.

FIG. 5 is an electric circuit of the case lighting system.

FIG. 6 is a top view of another design of the invention wherein a flag design is included on the window.

FIG. 7 is a top view of still another design wherein a wood top rolls out of the way so to expose the top window.

Referring now to the drawing in greater detail, and more particularly to FIGS. 1 to 4 thereof at this time, the reference numeral 10 represents a Lily Pad according to the present invention, wherein there is a small case 11 that may measure from one to six inches in depth, and which includes a transparent top window glass 12 so to allow observation thereinto, where there is contained a miniature landscape 13 of forest trees 14 and village houses 15 around a river, pond or lake 16 containing water 17 that is circulated through the case by means of inlet and outlet pipes 18 and 19 of the case which can be connected to a fresh water supply and a water drain of a house.

The lake accordingly comprises a depression containing the circulating water. A number of floating objects such as a boat 20 and flower blossoms or lily pads 21 float on the water surface. The circulating water provides movement of objects 20 and 21. The pipes 18 and 19 should communicate only with a lower strata of the water so that the floating objects are not carried out of the display.

In the present invention a mechanism 22, shown alone in FIG. 3 is installed upon a bottom 23 of the lake and is located between the water streams 17a and 17b of the inlet and outlet pipes, as shown in FIG. 1. The mechanism includes a stationary base 24 that rests upon the bottom 23. A paddles wheel 25 rotates freely on a vertical pin 26 supported on one end of the base. One of the blades of the paddle wheel supports a freely swivelling fork 27 in which one end of a vertical baffle 28 is guided. The opposite end of the baffle pivots freely on a pin 29 supported upon an opposite end of the base.

In use, as the water streams of the pipes 18 and 19 rotate the paddle wheel, the baffle is moved in position as shown by the solid and phantom lines in FIG. 3, so that the courses of the streams 17a and 17b are effected to continually vary. Thus the baffle 27 forms a variable barrier.

Also stationary barriers 30, 31 and 32 may be manually placed as wished in the lake for selectively controlling the course of the circulating water.

The barriers 30 is corrugated in shape so to stand up without a base.

The barrier 31 includes a polyethylene transparent pennant 33 teethered to its end, and a school of fish 34 painted thereon with opaque paint so that the pennant waves in the circulating water, and give to an observer the appearance of a school of fish swimming in the water.

The barrier 32 tapers in height toward one end so that water circulates over the top of this end, and holes 35 through this end also allows the water to circulate therethrough.

All barriers 22, 30, 31 and 32 are of transparent stiff plastic so to be invisible underwater.

An illumination system 36 for the display device includes a lamp 37 at each corner 38 hidden under the top bezel 39, the lamps being in an electric circuit 40 with an exterior extension cord 41 and plug 42 attachable to a household electric outlet.

In a modified design, shown in FIG. 6, the design may be that of a flag 43 submerged under the water so that the circulating water gives the effect to the flag image of waving in a wind.

In another design shown in FIG. 7, the display can includes a wood top 44 that rolls back over the top window.

In still other designs, not shown, the display can be made out of doors on a table so that natural falling rain gives a realistic effect. Or the design can be made of multi colored lights, so to imitate solar sunbursts and auroras as well as geometric lights patterns. Also musical sounds may be added thereto.

While various changes may be made in the detail construction, it is understood that such changes will be within the spirit and scope of the present invention as is defined by the appended claims.

What is claimed:

1. A display device, comprising in combination, a case, a transparent window on top of said case, and a display inside said case, said display including a miniature landscape together with a lake comprised of a depression with water therein, said water circulating through said case from an outside source via an inlet and said outlet, floating objects upon the surface of said water, an transparent barriers in said lake for controlling circulating of said water, said inlet and outlet located adjacent the bottom of said case in combination with means responsive to inlet flow providing variations in the flow pattern through the device.

2. The combination as set forth in claim 1 wherein said means comprises a mechanism placed on a bottom of said lake, said mechanism including a stationary base supporting an upwardly vertical pin at each end thereof, a freely rotatable propellor, on said pin, freely swivelled fork on one blade of said propellor, said fork guiding a vertical baffle pivoted on being placed between streams of said inlets and outlets.

3. The combination as set forth in claim 1, wherein one of said barriers tapers in height toward one end.

* * * * *